US005607539A

United States Patent [19]

Küppersbusch

[11] Patent Number: 5,607,539

[45] Date of Patent: Mar. 4, 1997

[54] LABELLING APPARATUS

[76] Inventor: Gerd Küppersbusch, Siemensstr. 34a, D-42551 Velbert, Germany

[21] Appl. No.: 419,059

[22] Filed: Apr. 10, 1995

Related U.S. Application Data

[63] Continuation of Ser. No. 146,048, filed as PCT/EP93/00573, Mar. 12, 1993, published as WO93/17917, Sep. 16, 1993, abandoned.

[30] Foreign Application Priority Data

Dec. 3, 1992 [DE] Germany .......................... 42 07 940.3

[51] Int. Cl.$^{6}$ .................................................... B32B 31/00

[52] U.S. Cl. ......................... 156/364; 156/563; 156/573; 156/DIG. 30; 271/33

[58] Field of Search .................................... 156/362, 363, 156/364, 563, 573, DIG. 29, DIG. 30; 271/33

[56] References Cited

U.S. PATENT DOCUMENTS

| | | | |
|---|---|---|---|
| 2,764,408 | 9/1956 | Weiler | 271/33 |
| 3,708,371 | 1/1973 | Alie | 156/363 |
| 3,819,173 | 6/1974 | Anderson et al. | 270/54 |
| 4,082,595 | 4/1978 | Slater | 156/364 X |
| 4,369,089 | 1/1983 | Mohn et al. | 156/573 X |
| 4,439,262 | 3/1984 | Zodrow et al. | 156/364 |
| 4,468,274 | 8/1984 | Adachi | 156/566 X |
| 4,555,299 | 11/1985 | Voltmer et al. | 156/566 X |
| 4,853,063 | 8/1989 | Basgil et al. | 156/238 |

FOREIGN PATENT DOCUMENTS

| | | | |
|---|---|---|---|
| 2535897A1 | 2/1976 | Germany . | |
| 2537547 | 6/1984 | Germany . | |
| 2011316 | 1/1990 | Japan | 156/389 |
| 765269 | 2/1955 | United Kingdom . | |

*Primary Examiner*—David A. Simmons
*Assistant Examiner*—Paul M. Rivard
*Attorney, Agent, or Firm*—George W. Neuner

[57] ABSTRACT

A labelling apparatus is provided wherein labels (21) are transported from a label magazine (9) to a labelling station by means of a conveyor belt (1). Adhesive is applied to the conveyor belt (1) by means of a pasting station (5) at the portions which are to receive a label (21). The pasted portion of the conveyor belt is brought into contact with the label to be received such that the label is taken over and transferred by the sticking effect exerted by the adhesive. The conveyor belt (1) passes around a delivery edge (3) where the label is lifted off from the conveyor belt and applied to the object to be labelled.

5 Claims, 5 Drawing Sheets

FIG. 9a
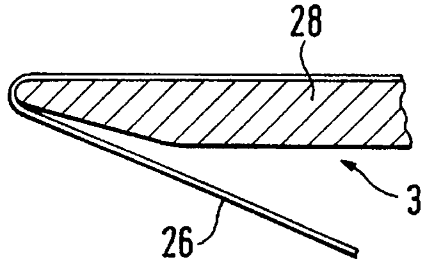
FIG. 9b
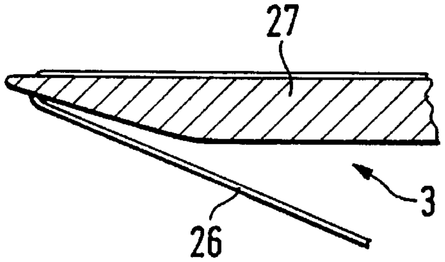
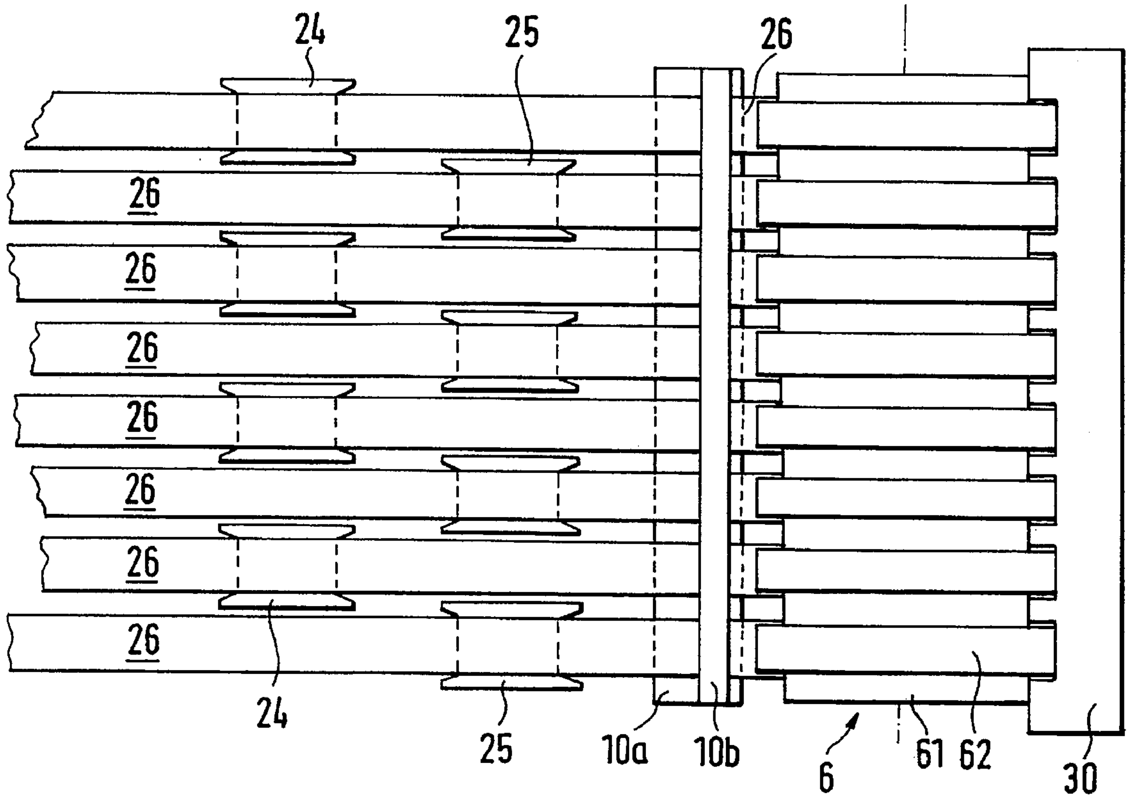
FIG. 10

LABELLING APPARATUS

This is a continuation of application Ser. No. 08/146,048 filed as PCT/EP93/00573, Mar. 12, 1993, published as WO93/7917, Sep. 16, 1993, now abandoned.

The invention relates to a labelling apparatus comprising a label magazine and a conveyor belt for transporting labels from the label magazine to a labelling station.

The U.S. Pat. No. 4,853,063 discloses a labelling apparatus wherein an adhesive label is dispensed at a dispensing edge from a conveyor belt which is completely covered with permanently adhering adhesive. Also wet label adhesives are known. Wet label adhesives allow the selection of the adhesive layer according to the specific application, i.e. thin, thick or contoured coating, and facilitate the removal of the labelling at returnable glasses.

It is the object of the invention to provide a labelling apparatus which combines the advantages of both systems while avoiding the disadvantages thereof.

This object is achieved by the labelling apparatus characterized in claim 1.

Further embodiments of the invention are characterized in the subclaims.

Further features and advantages of the invention will stand out from the description of embodiments in connection with the figures. In the figures:

FIG. 3 is a side view of a schematic representation of a first embodiment of a pasting station;

FIG. 4 is a side view in schematic representation of a second embodiment of a pasting station; and FIG. 5 shows a detail of a label magazine in enlarged representation;

Figure 8:
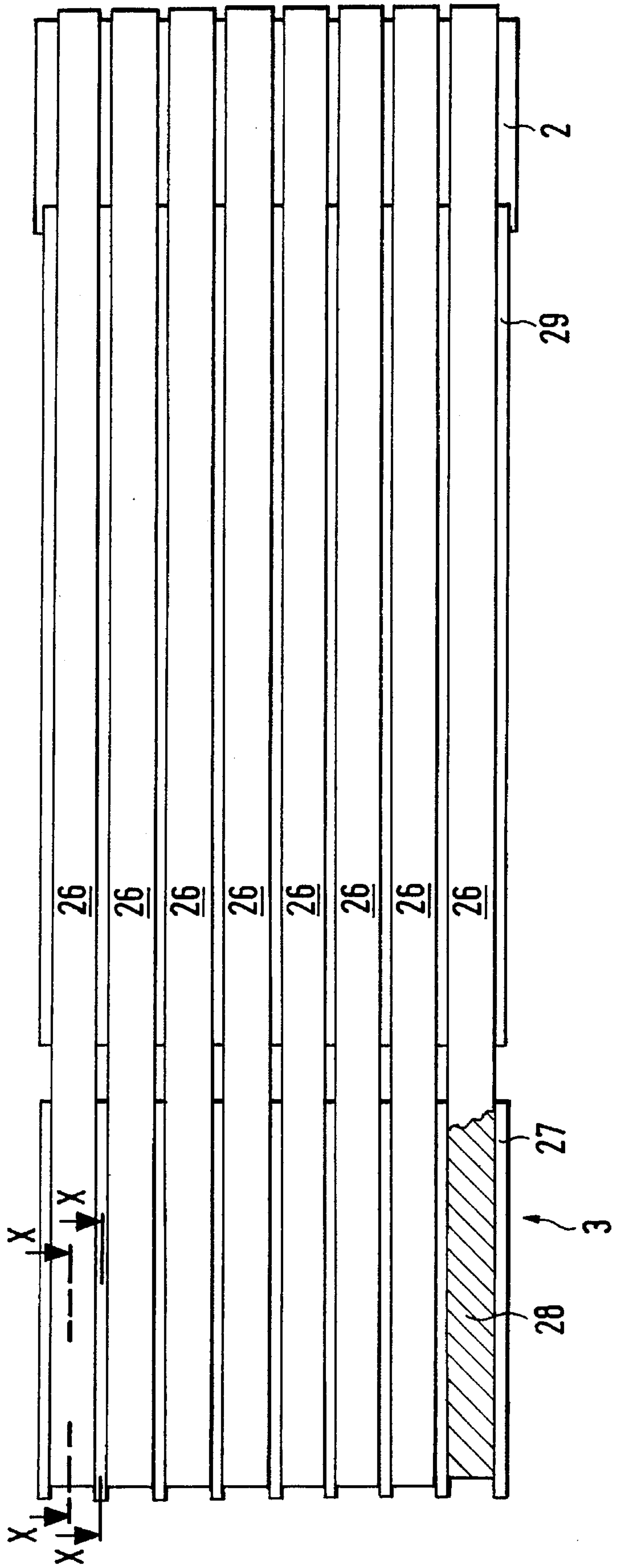
FIG. 8 is a top view of a second embodiment of a conveyor belt with drive cylinder and of a second embodiment of the label delivery station.

FIG. 9*a* is a sectional view along the dotted line XX of FIG. 8; and

Figure 6:
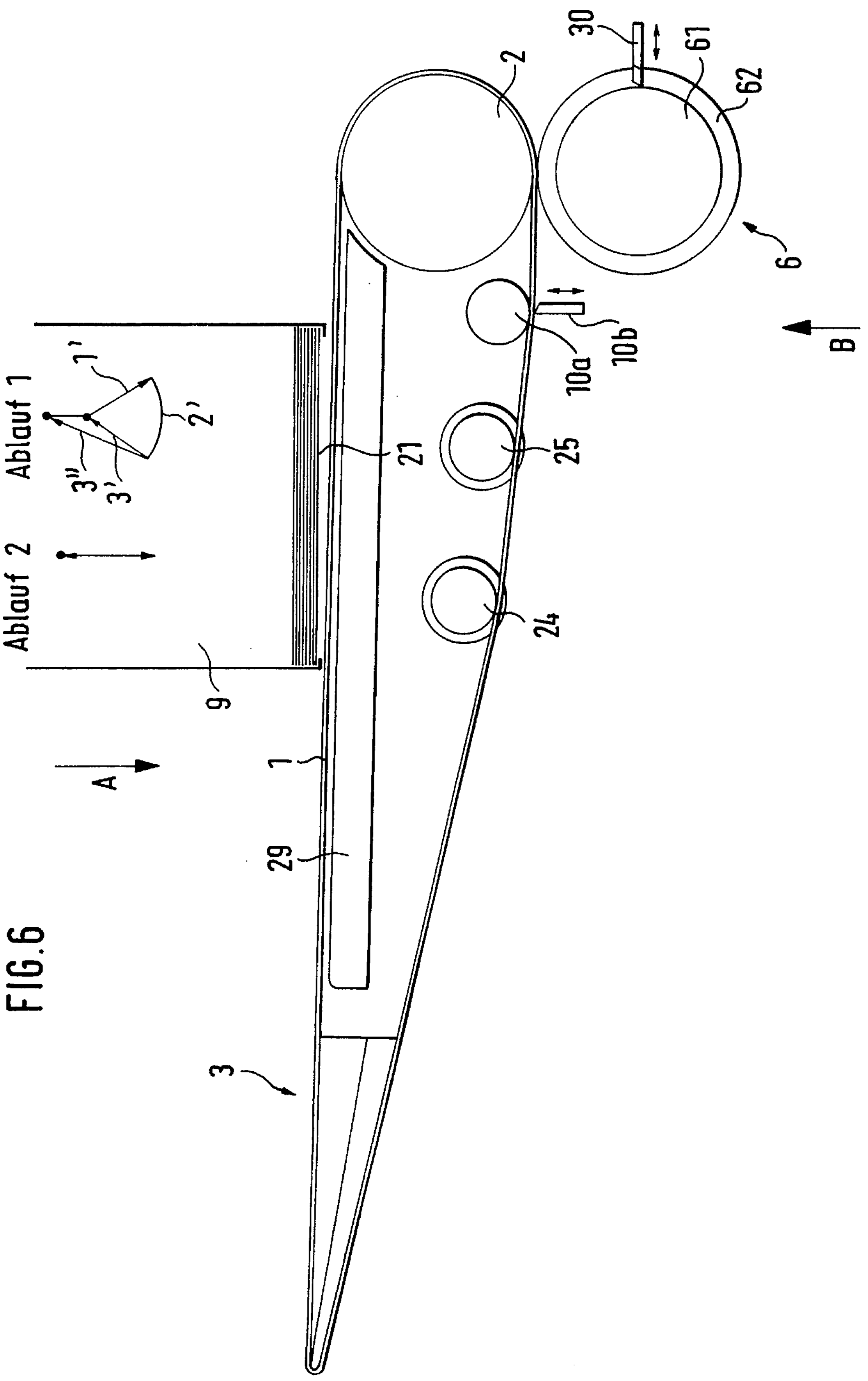
FIG. 6 is a schematic side view of parts of a second embodiment.
Figure 7:
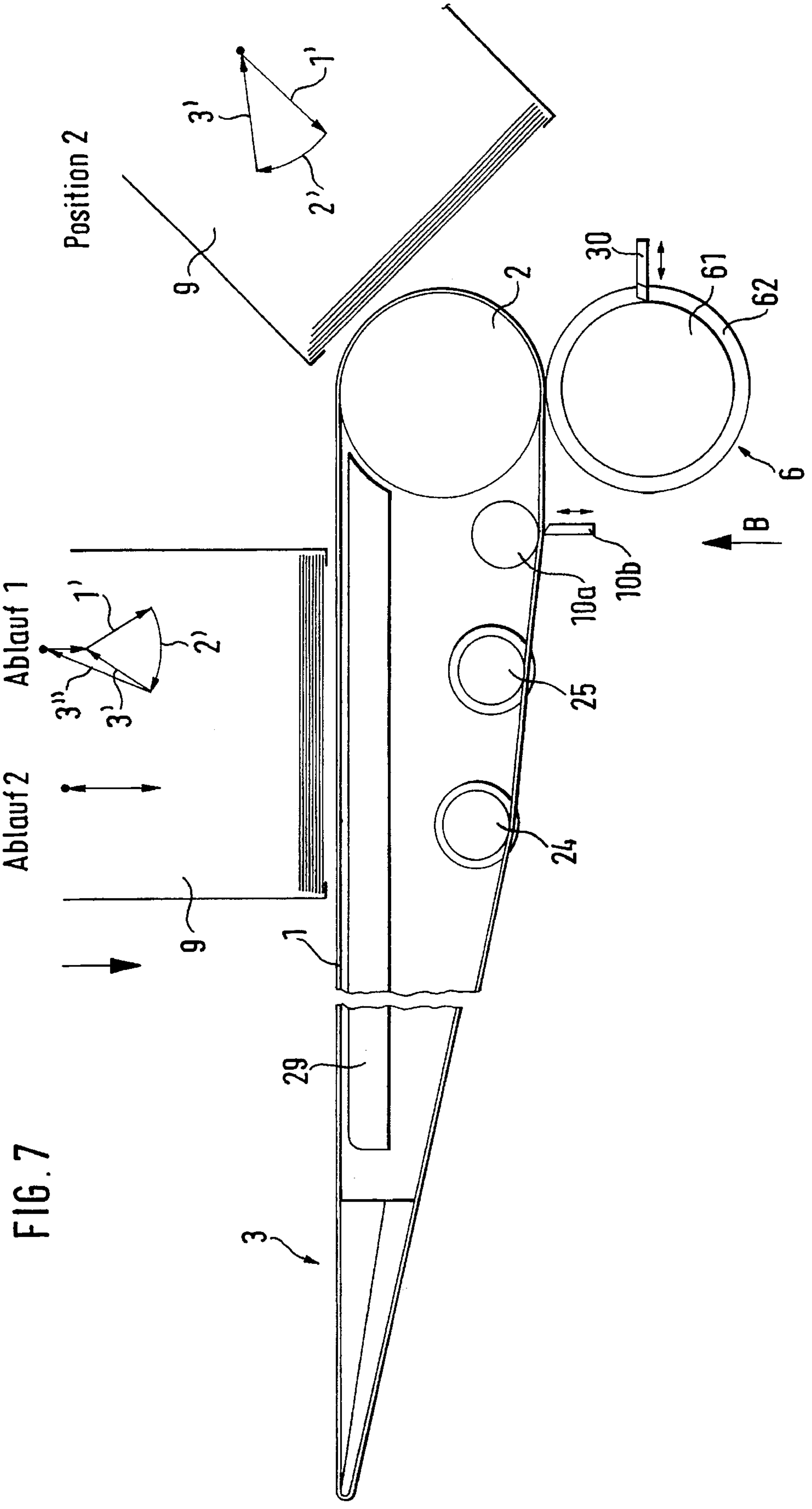
FIG. 7 is a schematic side view of parts of a third embodiment.

FIG. 9*b* is a sectional view along the continuous line XX of FIG. 8; and FIG. 10 is a top view of a part of the second and third embodiment seen in direction of the arrow B in FIG. 6 and FIG. 7.

The first embodiment of the labelling apparatus comprises a conveyor belt 1 which is endless in the present embodiment and which is guided around a drive cylinder 2 driving the conveyor belt. At the end opposite to the drive cylinder the conveyor belt turns around a delivery edge 3 where the belt is sharply bent off from the running direction thereof around the edge into the opposite direction. The drive cylinder is formed as a traction drum having laterally projecting studs in a manner similar to a paper feed traction drum for feeding of endless paper in a computer. At the places corresponding to the projecting studs the conveyor belt has lateral holes 4 for drivably connecting the drive cylinder with the conveyor belt in a slipless manner.

Figure 1:
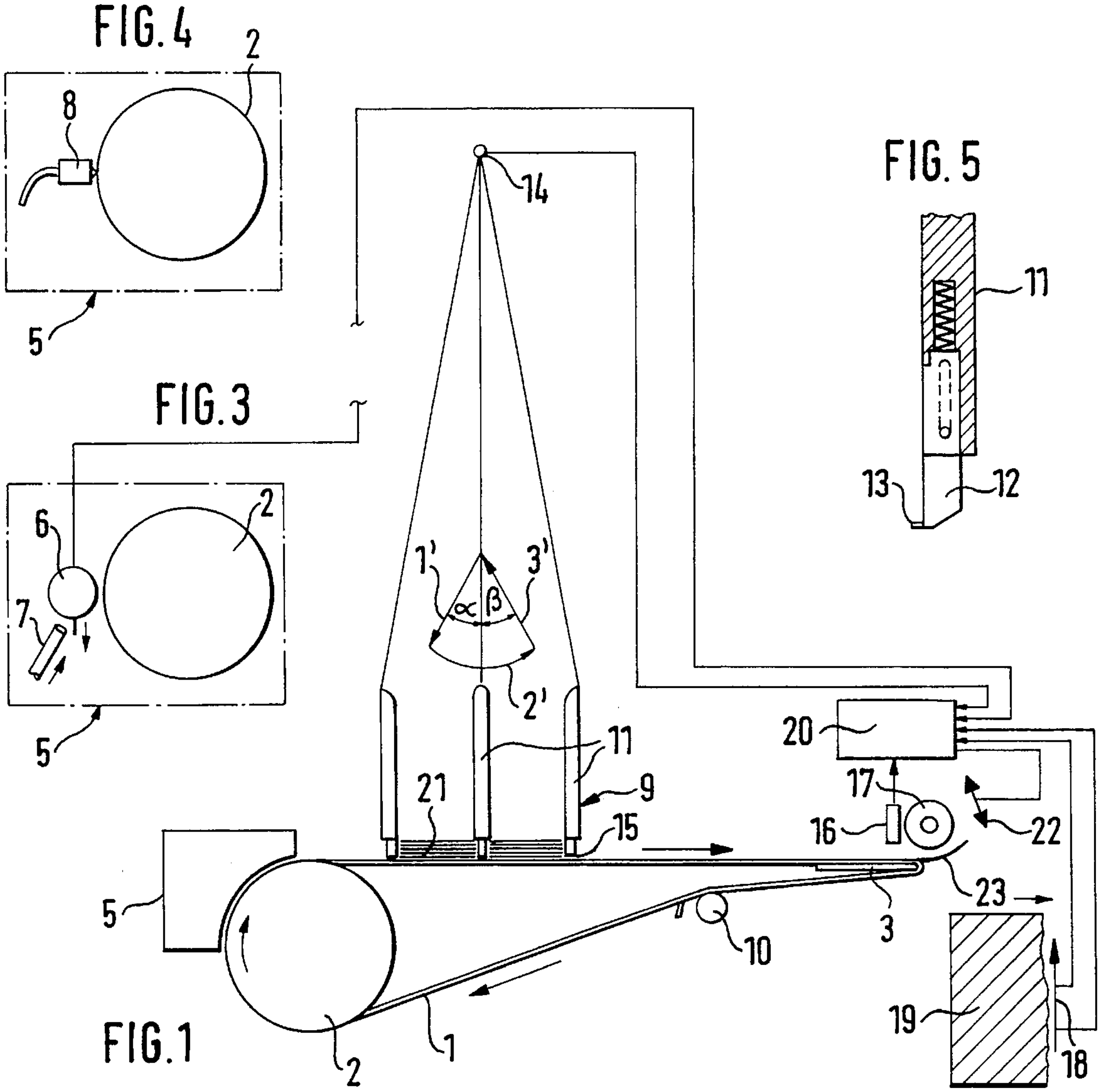
FIG. 1 is a schematic side view of a first embodiment of the labelling apparatus.
Figure 2:
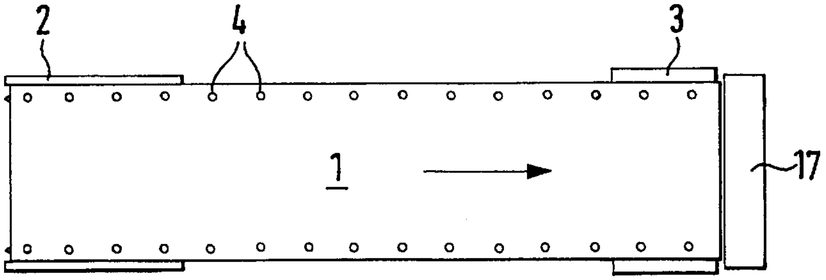
FIG. 2 is a top view of a first embodiment of a conveyor belt with drive cylinder and of a first embodiment of the label delivery station.

As best shown in the FIGS. 1, 3 and 4 a pasting station 5 is provided in the region of the drive cylinder. In the embodiment shown in FIG. 3 the pasting station can be seen to have a pasting drum 6 with an adhesive supply 7, distributing drums and an adhesive thickness adjustment means. In the pasting station shown in FIG. 4 the adhesive is supplied through an adhesive feed nozzle 8 extending across the corresponding width. In transport direction after the delivery edge 3 and between the same and the transport drum 2 there is a stripping and cleaning means 10 which serves the purpose of removing the adhesive which has not been used when applying the adhesive to the labels.

The label magazine 9 proper is located in transport direction after the drive cylinder and in a distance therefrom. The magazine comprises a frame with lateral retaining rods 11. As best shown in FIG. 5 the rods have a movable retaining finger 12 disposed at the lower end thereof and being biased by means of a compression spring. Each retaining finger is provided at the lower free end thereof with a small hook 13 which is bent towards the labels for supporting the labels and releasing the lowermost label whenever a predetermined adhesion between the label and the adhesive layer of the conveyor belt therebelow occurs.

The label magazine 9 is supported to pivot around an axis 14. The axis is disposed in a distance above the conveyor belt 1 and lies in a plane extending parallel to the conveyor belt and extends transversely to the advancing direction of the conveyor belt. The label magazine is supported such that it follows the path indicated by the arrows 1' to 3' in FIG. 1. This means that in a first cycle the label magazine is raised from the conveyor and inclined from a vertical direction by an angle α of about 5° to 10°. By moving as indicated by the arrow 1' the front edge 15 of the label magazine touches the belt 1. The edge 15 travels at the speed of the conveyor belt 1 so that in the position shown in FIG. 1 the entire bottom of the label magazine touches the surface of the belt. By a further pivoting movement around the angle B the front edge of the label magazine is lifted off from the belt and when contacting the belt only with the rear edge thereof the label magazine is upwardly retracted in the manner indicated by the arrow 3' and pivoted back into the start position. As mentioned above the angles α and β in FIG. 1 are not to scale. In reality they are preferably around 5° to 10°.

Close to the delivery edge 3 a photoelectric cell 16 for detecting labels transported on the belt is provided above the conveyor belt. A pressing roll 17 is provided right at the end of the delivery edge 3 for pressing the labels delivered from the delivery edge onto the object to be labelled. An apparatus for placing and lifting the object 19 to be labelled, as schematically indicated by an arrow 18 is provided adjacent to the delivery edge 3 and therebelow. The object is placed in such a manner that the surface 20 to be labelled lies in the plane of the arriving conveyor belt and adjacent to the delivery edge 3. The pressing roll 17 has a drive means indicated by the arrow 22 and is movable in direction of the arrow 22 onto the label 23 to be delivered by the delivery edge 3 for pressing the same onto the object 19 to be labelled.

A control unit 20 is provided which is supplied with the detection signal of the photoelectric cell 16. The control unit 20 is connected with the means 18 for transporting the object to be labelled, with the drive means for the drive cylinder 2, with the drive means for the label magazine 9, the pasting station 5 as well as with the drive means for the pressing roll 17.

In operation adhesive is applied to the surface of the conveyor belt in the pasting station 5. The control unit 20 cycles the drive for the label station in such a manner that the back surface of the lowermost label 21 contacts the pasted portion of the conveyor belt 1. The label is drawn from the stack by contact with the adhesive and moved on with the conveyor belt, whilst the remaining labels are retained by the hooks 13 of the retaining fingers 12. The label is carried on by the conveyor belt 1 and detected by the photoelectric cell 16. At the delivery edge the label is lifted off from the belt and moved on in a straight direction. In this instant the object to be labelled is placed at the delivery edge. The pressing roll 17 presses the label 23 onto the object 19 to be labelled, whereby the object is moved on in a plane and in advancing direction of the conveyor belt and synchronously with the speed thereof and so-to-speak pulls off the label 23 further delivered from the belt, whereby the label is then completely pressed by the pressing roll 17.

In the above-described embodiment certain regions of the conveyor belt 1 which are to receive a label are provided with adhesive in the pasting station. For particular label shapes the adhesive can be applied in a contoured manner. In all cases the adhesive is transferred to the label by contact thereof with the pasted conveyor belt 1.

Rather than pressing the label 23 onto the object 19 to be labelled behind the delivery edge 3 by using the pressing roll the pressing can be carried out by blowing air from a compressed air source thereagainst.

According to a modified embodiment the belt is driven by a toothed belt vulcanized onto the conveyor belt rather than by the traction drum.

In FIG. 6 a second embodiment of the labelling apparatus is shown. The not shown components such as the details of the label magazine 9, the pressing roll 17 etc. correspond to the embodiment shown in FIG. 1.

In this second embodiment the possible sequence 2 which is also shown in FIG. 6 is added to the sequence 1 of movement of the label magazine 9 described in connection with the first embodiment. With this sequence 2 the label magazine moves up and down only in a direction which is substantially vertical to the plane of the conveyor belt 1. The control unit 20 cycles the drive for the labelling station in such a manner that the rear surface of the lowermost label 21 contacts the pasted portion of the conveyor belt 1. A counterplate 29 is provided opposite to the label magazine 9 on the other side of the conveyor belt 1. This counterplate 29 serves for relief of the conveyor belt 1 when applying the label 21 to the pasted conveyor belt 1.

It may happen that the serialization of the labels at the position indicated at position 1 in FIG. 7 does not work properly. This is in particular dependent on the selected adhesive and the quality of the labels used. In a third embodiment of the labelling apparatus therefore an alternative position 2, as shown in FIG. 7, is provided. At this position 2 the label magazine 9 moves substantially as in sequence 1 in position 1. In position 2 the lowermost label 21 is brought into contact with the pasted portion of the conveyor belt 1 while the pasted portion of the conveyor belt 1 is on the drive cylinder 2.

In the embodiments described so far in connection with FIGS. 1 to 7 conveyor belts 1 consisting of a single belt extending across the entire width of the conveyor, as shown in FIG. 1, or conveyor belts 1 consisting of several separate belts 26, as described below, can be used.

FIG. 8 is a top view of a conveyor belt as seen in direction of the arrow A shown in FIGS. 6 and 7. As clearly seen the conveyor belt consists of several separate individual belts 26. The individual belts 26 pass from right to left in FIG. 8 around the drive cylinder 2, thereafter below the label magazine 9 (not shown) with the counter roll 29 opposite thereto, and thereafter to the delivery edge 3. The delivery edge 3 consists of strippers 27 and single band guides 28.

Dependent on the quality of the adhesive and the paper it may happen that the label sticks to the conveyor belt so strongly that it is transported around the delivery edge 3. This problem is encountered with a single conveyor belt 1, but could also occur with conveyor belts consisting of several separate individual belts 26. In order to solve this problem the embodiment having strippers 27 as described below is created.

FIG. 9*a* shows a sectional view along the dotted line XX of FIG. 8 and FIG. 9*b* shows a sectional view along the solid line XX of FIG. 8. As best seen in FIGS. 8, 9*a* and 9*b* the conveyor belt 1 consists of several separate bands 26. The space existing between the individual belts is used for the integration of strippers 27 into the delivery edge 3. The strippers 27 project beyond the conveyor belt 1, 26 which passes downwardly at the delivery edge in direction of the further movement of the label. The delivery edge 3 has single band guides 28 between the stripper 27. The strippers 27 safely detach the label from the conveyor belt 1, 26.

The separate individual belts 26 are driven in the same manner as the single conveyor belt 1 by means of the drive cylinder 2. A slipless drive may be obtained with the single conveyor belt 1 as well as with the conveyor belt consisting of several individual belts 26 by means of a spiked roller and holes, a toothed ring and tooth belts or a coating of the belts and/or of the surfaces of the drive cylinder contacting the corresponding belts. When using the coating the corresponding surfaces are coated with a material which results in a high static friction between the belt and the drive cylinder, such as rubber coatings.

It can be seen in FIGS. 6 and 7 that tension rollers 24, 25 are provided for tensioning the conveyor belt. In FIGS. 6 and 7 a second embodiment of the stripping and cleaning means 10 is shown which consists of a counter roll 10*a* and a scraper 10*b*. The counter roll 10*a* serves as a support for the separate belts 26 in order to prevent the same from damage by the scraper 10*b*. The scraper can be adjusted in a direction perpendicular to the running direction of the conveyor belt 1, 26.

The pasting drum 6 shown in the FIGS. 6 and 7 corresponds to the pasting drum 6 of the pasting station 5 in FIG. 3. The embodiment of the pasting drum 6 shown in the FIGS. 6 and 7 comprises different sections 61, 62 having a different perimeter. A comb-like scraper 30 grasps between the sections of different perimeter, as schematically shown in FIGS. 6 and 7.

FIG. 10 shows a top view of the tension rollers 24, 25, the counter roll 10*a*, the scraper 10*b*, the pasting drum 6 with the sections 61, 62 thereof having a different perimeter and the substantially comb-like scraper in direction of the arrow B shown in FIGS. 6 and 7. The tension rollers 24 and 25 disposed on a common axis tense the individual bands 26. As clearly shown in FIG. 10 the sections 61, 62 of different perimeter of the pasting drum 6 are arranged in such a manner that the sections having the larger perimeter apply adhesive to the individual belts 26, whereas the sections having smaller perimeter 61 are opposite to the gaps between the individual belts 26. The comb-like scraper 30 which is displaceable in a direction perpendicular to the substantially cylindrical surfaces of the sections 61, 62 of the pasting drum as shown in FIGS. 6 and 7, serves for adjusting the thickness of the adhesive applied to the individual belts 26 by the sections 62 having the greater perimeter, or for the complete removal of the adhesive in case that no label is used.

According to a further embodiment the counterplate 29 formed below the bottom side of the label magazine 9 facing the conveyor belt for supporting the conveyor belt when applying the label to the conveyor belt is lengthened to such an extent that it can be used as a counterplate for a document inscriber provided behind the label magazine in transporting direction. Such a document inscriber also serves for printing of line codes, so-called bar codes, to the labels. Further, texts and symbols may be printed to the labels during the labelling procedure.

In all embodiments the belts may be all-over pasted rather than only those regions of the belts 1, 26 where a label is to be applied. The adhesive which is collected by the stripping and cleaning means 10 or by the scraper 10*b* can be reused for pasting the belt 1, 26. In this manner the available adhesive is completely used. It is not necessary in this embodiment to adjust the pasting station 5 to the label used.

I claim:

1. A labelling apparatus comprising:

a labelling station, a conveyor belt to transfer labels to said labelling station, means for positioning an object to be labelled at said labelling station, a delivery edge provided at said labelling station, a drive cylinder for driving said conveyor belt, a label magazine, a pasting station provided ahead of said label magazine in transport direction to apply adhesive to said conveyor belt, and means to pivot the label magazine so that in a first cycle, the label magazine bottom is raised from the conveyor belt and inclined from a vertical direction by an angle α, of from about 5° to about 10°, to touch a front edge of the magazine to the conveyor belt, in a second cycle, the label magazine travels with the conveyor belt and the label magazine pivots with the entire bottom of the label magazine touching the surface of the conveyor belt, and in a third cycle, the label magazine further pivots at an angle α, of from about 5° to about 10°, to lift the rear edge of the label magazine off the conveyor belt and then to retract the label magazine from the conveyor belt.

2. The labelling apparatus of claim 1, wherein said conveyor belt is an endless one-piece conveyor belt, and wherein said delivery edge extends across the entire width of said conveyor belt passing therearound.

3. The labelling apparatus of claim 1, wherein said conveyor belt comprises a plurality of endless parallel separate belts, and wherein said delivery edge comprises stripping means for stripping said labels from said belts and single belt guide means for guiding said separate belts forming said conveyor belt.

4. The labelling apparatus of claim 1, wherein said drive cylinder is a spiked roller, a toothed gear or a coated drive roller, and wherein said conveyor belt comprises traction, a toothed belt or a surface cooperating therewith, respectively, to transport sliplessly said plurality of endless parallel separate belts.

5. The labelling apparatus of claim 4, further comprising a control means for controlling said drive cylinder and said label magazine, and a photoelectric cell to detect a label, said photoelectric cell being positioned behind said label magazine and having a signal output which is connected to an input of said control means.

* * * * *

UNITED STATES PATENT AND TRADEMARK OFFICE
CERTIFICATE OF CORRECTION

PATENT NO. : 5,607,539

DATED : March 4, 1997

INVENTOR(S) : Gerd Kuppersbusch

It is certified that error appears in the above-identified patent and that said Letters Patent is hereby corrected as shown below:

On the title page, item:

[30] Foreign Application Priority Data

Mar. 12, 1992 [DE] Germany .............. 42 07 940.3

Signed and Sealed this

Twenty-fourth Day of June, 1997

*Attest:*

BRUCE LEHMAN

*Attesting Officer* *Commissioner of Patents and Trademarks*